US008479797B1

(12) United States Patent
Hurst

(10) Patent No.: US 8,479,797 B1
(45) Date of Patent: Jul. 9, 2013

(54) APPARATUS FOR REMOVING LABELS

(76) Inventor: Richard F Hurst, Vero Beach, FL (US)

( * ) Notice: Subject to any disclaimer, the term of this patent is extended or adjusted under 35 U.S.C. 154(b) by 18 days.

(21) Appl. No.: 13/457,522

(22) Filed: Apr. 27, 2012

(51) Int. Cl.
*B32B 38/10* (2006.01)

(52) U.S. Cl.
USPC ........... 156/762; 156/717; 156/761; 156/921; 156/936

(58) Field of Classification Search
USPC .......................... 156/717, 761, 762, 921, 936
See application file for complete search history.

(56) References Cited

U.S. PATENT DOCUMENTS 1,863,338 A * 6/1932 Hoffman ........................ 15/93.1
4,013,497 A * 3/1977 Wolf ............................ 156/154
4,122,734 A 10/1978 Hurst
5,152,865 A 10/1992 Hurst
5,651,846 A 7/1997 Hurst
5,685,053 A * 11/1997 Deonarine et al. ........... 29/426.4
6,199,615 B1 * 3/2001 Klarl ............................ 156/750
2010/0276083 A1 * 11/2010 Hurst ............................ 156/344

* cited by examiner

*Primary Examiner* — Mark A Osele
*Assistant Examiner* — Nickolas Harm
(74) *Attorney, Agent, or Firm* — Michael R. Philips

(57) ABSTRACT

The apparatus and method disclosed is for removing labels from surfaces, especially from pharmaceutical vials. Each vial is brought into a travel path where it is moved forward by a linear driver. The vial is first pushed through a circular array of slitter blades to create a series of longitudinal slits in the label. The vial is next pushed through a circular array of scraper blades that remove the label segments between each pair of slits. The label segment residue is discarded through a vacuum system.

15 Claims, 3 Drawing Sheets

APPARATUS FOR REMOVING LABELS

FIELD OF THE INVENTION

The present invention relates to the field of apparatus and methods for removing labels from objects having a hard surface, and more particularly to removing labels from vials.

BACKGROUND OF THE INVENTION

Containers for pharmaceutical liquids are generally termed vials, covering a capacity range of from approximately 30 ml to approximately 1000 ml. Vials are typically configured of molded glass with a substantially cylindrical body portion and a somewhat narrower neck, the opening at the top of the neck being sealed with an elastomeric membrane held by a metallic band. At the microscopic level, molded glass often has flat spots and indentations. A printed label is applied to the vial with an adhesive. The label is typically a plastic film, and the adhesive is typically an acrylic polymer with strong adhesion characteristics. Certain vials are intended to be suspended from a support pole in a medical environment to dispense the vial's contents by force of gravity. In this instance, a band is adhered to the vial over the label with a suspension loop connected to the band but not glued. Whereas the loop and band must securely support the weight of the vial and contents, the band must be adhered to the label and the label to the vial with an aggressive adhesive. Occasionally, it is necessary to remove labels, e.g. if an error in information or contents makes the existing label inaccurate. In order to remove the printed information label, it would be necessary to also remove the band and suspension loop.

The field of apparatus and methods for removing labels from rigid containers is represented by U.S. Pat. No. 4,122,734 for a Label Stripping Machine, U.S. Pat. No. 5,152,865 for a Method For Clean Removing Labels From Containers, and U.S. Pat. No. 5,651,846 for Method And Apparatus For Removing The Printed Layer Of Labels From Semirigid Containers. The degree of adhesion of the labels to vials discussed above has been determined to be beyond the ability of the apparatus and methods of these patents. Therefore, a need exists for an apparatus and method for removing labels that are adhered to vials or other objects with hard surfaces with a particularly aggressive adhesive.

SUMMARY OF THE INVENTION

The invention provides an apparatus and method for removing labels that are adhered aggressively to vials or other hard surface objects. The invention apparatus has an array of slitter blades that are applied to cut parallel slits through the label, forming label strips. In a second stage, an array of scraper blades lift the label strips formed between the slits from the surface. Both the slitter blades and the scraper blades are pivotally mounted and biased to press on the surface of the vial or other object being moved thereby. A vacuum device is provided for removing the residual debris from the label scraping operation.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENT

Figure 1:
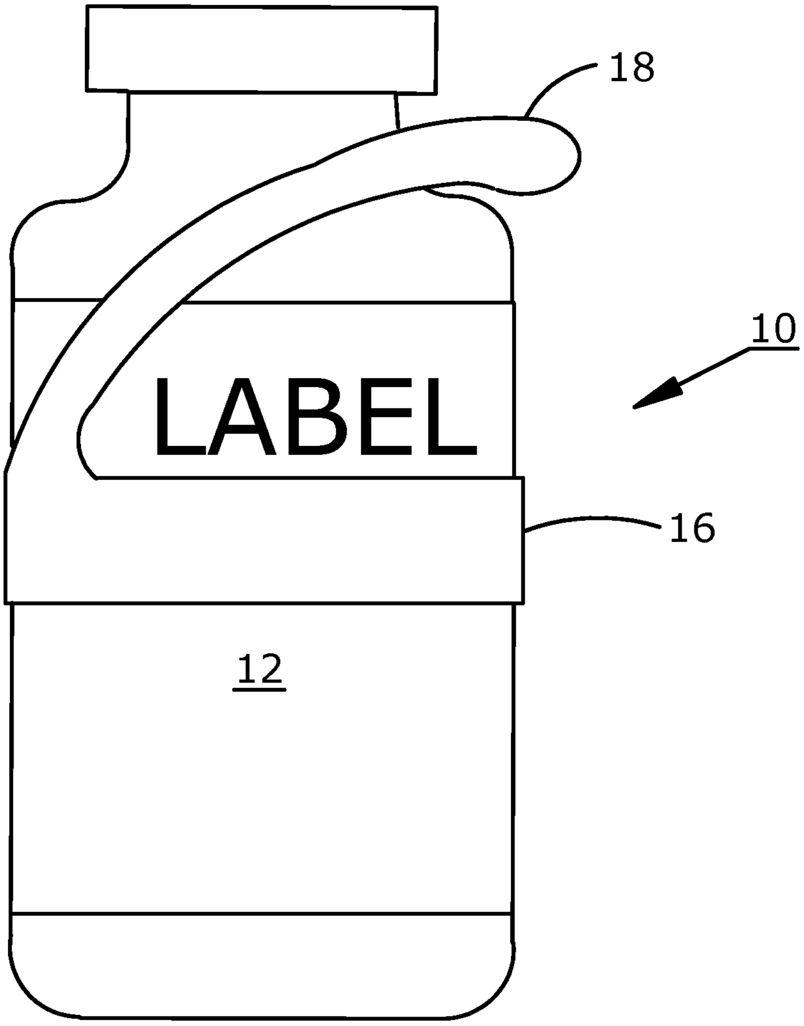
FIG. 1 is a front elevation view of a typical vial with a printed information label adhered thereto and a connected hanging loop band.

Referring to FIG. 1, a typical object with a hard surface, e.g. a glass vial 10, is shown in front elevation view. A label 12 is mounted to the outer surface of vial 10 by a relatively aggressive adhesive. A band 16 with a connected hanging loop 18 is mounted to the outer surface of label 12 by a relatively aggressive adhesive in a manner for supporting vial 10 from an intravenous pole, or the like. Label 12 is generally formed of plastic film sheet material. Band 16 is typically formed of a tough, resilient plastic resin. Band 16 and label 12 are adhered to one another and to vial 10 with relatively aggressive adhesives, e.g. acrylic polymer adhesive, to provide secure support when vial 10 is filled with a valuable liquid pharmaceutical and hanging from a intravenous pole.

Figure 2:
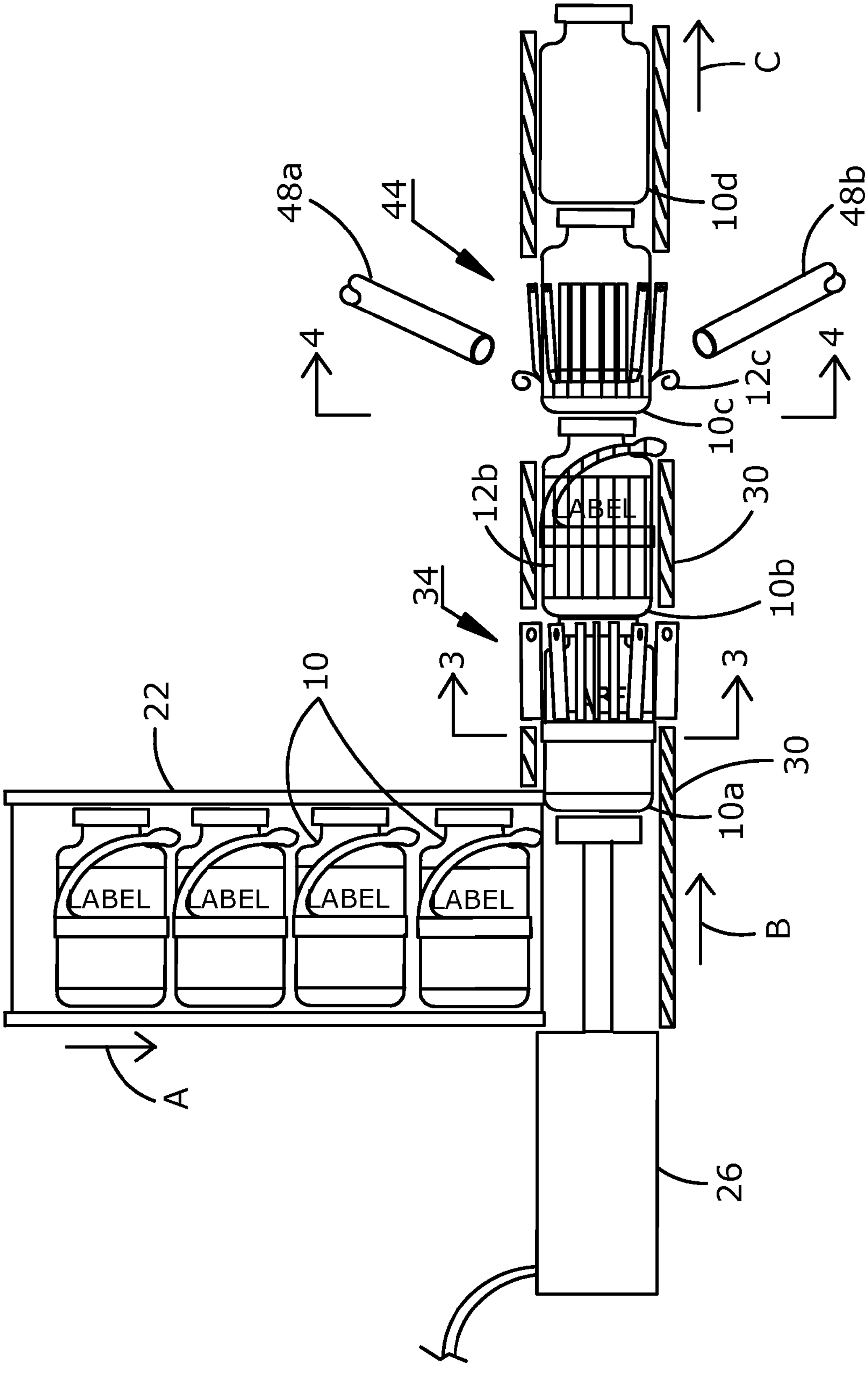
FIG. 2 is a top plan view of one embodiment of the invention apparatus.

Referring now to FIG. 2, a preferred embodiment of the invention apparatus for removing labels, especially plastic film labels and bands aggressively adhered to the vials, is shown in top plan view. A conveyor 22, or similar supply mechanism, is mounted to deliver a series of labeled vials 10 in the direction indicated by arrow A to a set of guide rails 30, guide rails 30 being depicted with hatch lines for clarity. Whereas the guide rails are depicted in horizontal orientation, it is understood that vertical orientation with vials 10 being moved upward would function equally well. Similarly, conveyor 22 may be in an alternate orientation. Vials 10 are preferably oriented with their caps facing to the right as illustrated for travel in the direction of the travel path indicated by arrow B. A linear actuator 26, e.g. a pneumatic cylinder, is mounted at an entry end of the travel path as delineated by guide rails 30. Guide rails 30 are shown as segmented to permit placement of operating mechanisms intermediate thereof. A labeled vial 10*a* has been positioned on guide rails 30 and been moved in the direction indicated by arrow B there along. Vial 10*a* is illustrated as positioned partially through a slitter array 34. Slitter array 34 is preferably formed as a radial array of slitter blades to circumferentially contact the periphery of vial 10*a*. It is understood that application of the invention to remove adhered labels from objects having a planar surface would involve a planar slitter array. A second vial 10*b* is seen in a position beyond slitter array 34 and supported on a further section of guide rails 30. Label 12*b*, adhered to vial 10*b*, is shown as having been divided by a series of slits that were created by passing through slitter array 34.

Referring further to FIG. 2, vial 10*c* continues to move in the direction of arrow B to pass through a scraper array 44. Scraper array 44 is preferably formed as a radially array of scraper blades to circumferentially contact the periphery of vial 10*c*. When labels are to be removed from objects with a planar surface the array of scraper blades will also be planar. The invention provides one scraper blade in scraper array 44 for each slitter blade in slitter array 34 with the slitter blades and the scraper blades circumferentially interspersed. This interspersed arrangement allows each scraper blade to contact and lift a section of label between adjacent slits. The sections of lifted label, indicated by numeral 12c, are removed by means of a vacuum with inlet nozzles 48a, 48b. Alternate arrangements for label segment removal devices, e.g. an annular vacuum ring, are within the scope of the present invention. Subsequent to passing through scraper array 44 and vacuum nozzles 48a, 48b, vial 10d is substantially clean and in position at the exit of the travel path to be discharged for further processing. Any additional label or adhesive residue may be removed in a subsequent operation.

Figure 3:
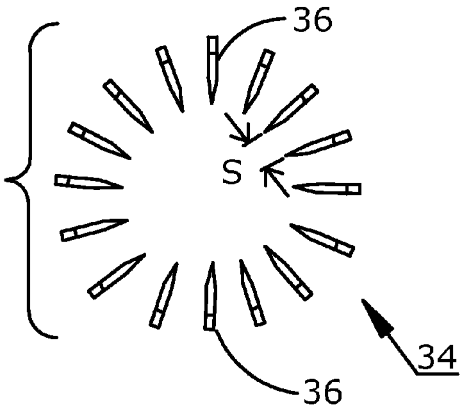
FIG. 3 is an axial view of slitter blades mounted in a circular array.
Figure 3A:
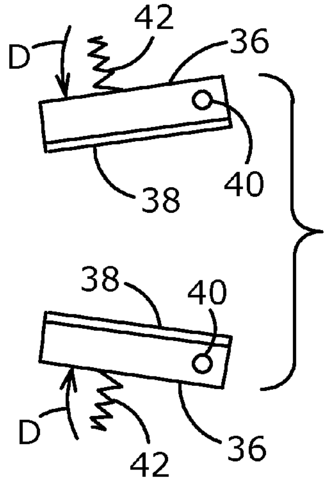
FIG. 3A is a side elevation view of a pair of opposed slitter blades as seen in the array of FIG. 3.

Referring now to FIGS. 3 and 3A, slitter array 34 is seen in end view in the direction indicated by line 3-3 of FIG. 2. A plurality of slitter blades 36, according to the preferred embodiment, reside in a circular array sized to press against the outer diameter of a vial 10a (see FIG. 2). Each slitter blade 36 is oriented along a radius of the circle and spaced from each other at the innermost diameter by a distance S. Distance S is preferably between 2.0 mm (0.080 inch) and 10.0 mm (0.394 inch), most preferably approximately 8.0 mm (0.315 inch). FIG. 3A depicts a pair of diametrically opposed slitter blades 36, e.g. slitter blades 36 seen at the top and bottom of the array of FIG. 3. Slitter blades 36 are each formed with a cutting edge 38, cutting edge 38 facing toward the center of the circular array. Slitter blades 36 are each mounted on a pivot 40 and are biased to pivot in the direction indicated by arrow D by a spring 42 or other biasing means. Therefore, slitter blades 36 will press against and cut through a label on the surface of the vial being processed. As shown in FIG. 2, slitter array 34 creates a series of slits through label 12b that are oriented parallel to the axis of vial 10b and separated from one another. An alternate configuration for the slitter blades illustrated is a rotatable circular knife blade.

Figure 4:
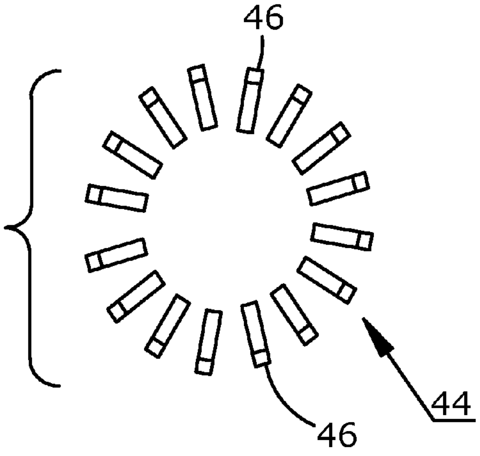
FIG. 4 is an axial view of scraper blades mounted in a circular array.
Figure 4A:
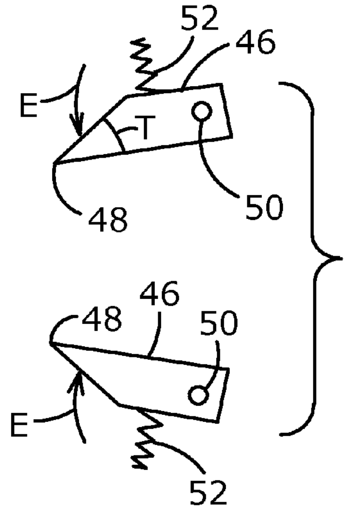
FIG. 4A is a side elevation view of a pair of opposed scraper blades as seen in the array of FIG. 4.

Referring now to FIGS. 4 and 4A, scraper array 44 is seen in end view in the direction indicated by line 4-4 of FIG. 2. A plurality of scraper blades 46 reside in a circular array having a similar inside diameter as the array of FIG. 3, i.e. a diameter sized to press against the outer diameter of a vial 10c (see FIG. 2). The number of scraper blades 46 is equal to the number of slitter blades 36 of FIG. 3. Each scraper blade is oriented along a radius of the circle and positioned between adjacent pairs of slitter blades 36 (FIG. 3). FIG. 4A depicts a pair of diametrically opposed scraper blades 46. Scraper blades 46 are each formed with a scraping edge 48, each scraping edge 48 being aligned tangential to the outer surface of vial 10c (FIG. 2). Scraping edge 48 of each scraper blade 46 is generally in the form of a chisel edge, i.e. tapered on one side only, with a cutting angle T of approximately 30°. As shown, scraper blade 46 is oriented with the flat side closer to the vial and the angled side farther from the vial. In a further embodiment, the chisel edge of scraper blades may be in arcuate form to approximately conform to the curvature of the vial being processed. Scraper blades 46 are each mounted on a pivot 50 and are biased to move pivotally in the direction indicated by arrows E by a spring 52 or other biasing means to press against the vial surface and lift the label segments therefrom. Therefore, after slitter array 34 (see FIG. 2) creates a series of slits through label 12b, scraper array 44 scrapes the portions of label 12b from vial 10c to be discarded as label scraps 12c.

Vials are typically made of molded glass and have an irregular surface on the microscopic level, including flat spots and depressions. In order to maximize the operational life of blades in contact with the irregular glass surface of vials, slitter blades 36 and scraper blades 46 are formed of a tough, durable steel alloy containing no less than 8.0% vanadium.

Therefore, the method for removing labels according to the present invention involves the steps of:

1. passing a series of vials along a travel path through a circular array of radially oriented slitter blades that are biased into contact with the vial to create a number of slits through the labels parallel to the travel path;

2. passing the vials further along the travel path through a circular array of radially oriented scraper blades that are biased into contact with the vial to scrape the label segments residing between the slits from the vial surface; and 3. removing the label segments scraped from the vials with a vacuum and discarding the label segments.

Having removed the incorrect labels from the vials, the vials may be further cleaned as necessary and a correct label applied. Therefore, the apparatus and method described herein has effectively and efficiently salvaged the vials and the contents therein after a labeling error.

Whereas the invention described herein is primarily directed to an apparatus and method for removing labels from vials, it will be readily understood to similarly apply to labels on a planar or other shaped object surface. It is therefore believed to be within the scope of the invention to apply the apparatus and method disclosed to objects of various geometry for the removal of labels.

While the description above discloses a preferred embodiment of the present invention, it is contemplated that numerous variations and modifications of the invention are possible and are considered to be within the scope of the claims that follow.

What is claimed is:

1. Apparatus for removing labels from vials, comprising:

a. means for moving a series of vials sequentially into a linear travel path, the travel path having an entry and an exit;

b. a linear driver aligned with the travel path, the driver positioned adjacent to the entry;

c. a plurality of slitter blades mounted in a circular array perpendicular to the travel path to contact each vial, the slitter blades positioned downstream of the linear driver; and d. a plurality of scraper blades mounted in a circular array perpendicular to the travel path, the scraper blades located downstream of the plurality of slitter blades.

2. The apparatus described in claim 1, wherein the slitter blade circular array is sized to contact the circumferential surface of the vials for slitting the labels.

3. The apparatus described in claim 1, further comprising biasing means for urging the slitter blades into slitting contact with the vials.

4. The apparatus described in claim 3, wherein the slitter blades are mounted for being pivoted and the biasing means comprises a compression spring.

5. The apparatus described in claim 1, wherein the scraper blade circular array is sized to contact the circumferential surface of the vials for lifting segments of the labels, each of the scraper blades located circumferentially between a pair of adjacent slitter blades.

6. The apparatus described in claim 1, further comprising biasing means for urging the scraper blades into scraping contact with the vials.

7. The apparatus described in claim 6, wherein the scraper blades are mounted for being pivoted and the biasing means comprises a compression spring.

8. The apparatus described in claim 1, wherein the scraper blades are configured with a chisel edge.

9. The apparatus described in claim 1, wherein the means for moving a series of vials sequentially into a linear travel path comprises a conveyor.

10. Apparatus for removing labels, comprising:

a. means for passing an object having a label adhered to a surface thereof along a travel path;

b. an array of slitter blades mounted adjacent to the travel path in order for the slitter blades to create a series of segments of label; and c. an array of scraper blades mounted adjacent to the travel path, the scraper blades positioned downstream of the slitter blade array, the scraper blades positioned to contact the object and scrape the segments of label from the surface of the object.

11. The apparatus described in claim 10, further comprising biasing means for urging the slitter blades into contact with the object.

12. The apparatus described in claim 11, wherein the slitter blades are mounted for being pivoted and the biasing means comprises a compression spring.

13. The apparatus described in claim 10, further comprising biasing means for urging the scraper blades into contact with the object.

14. The apparatus described in claim 13, wherein the scraper blades are mounted for being pivoted and the biasing means comprises a compression spring.

15. The apparatus described in claim 10, wherein the scraper blades are configured with a chisel edge.

* * * * *